United States Patent [19]

Martinez

[11] 4,322,202
[45] Mar. 30, 1982

[54] DOUGH EXTRUDER AND SHEET SPREADER APPARATUS

[76] Inventor: Salvator Martinez, 1106 Charlinda, West Covina, Calif. 91790

[21] Appl. No.: 208,990

[22] Filed: Nov. 21, 1980

[51] Int. Cl.³ .............................................. A21C 3/04
[52] U.S. Cl. ..................................... 425/208; 99/348; 264/176 R; 366/77; 366/83; 366/91; 425/209; 425/376 R; 425/376 A; 425/461; 425/462
[58] Field of Search ............... 425/204, 205, 238, 209, 425/239, 133.5, 133.1, 376 R, 376 A, 377, 461, 466, 462, 207–208; 264/176 R, 349, 108; 366/77, 91, 83; 99/348

[56] References Cited

U.S. PATENT DOCUMENTS

| | | | |
|---|---|---|---|
| 2,414,097 | 1/1947 | Garvey et al. | 264/108 |
| 3,085,289 | 4/1963 | Van Riper | 425/461 |
| 3,225,715 | 12/1965 | Page | 425/204 |
| 3,256,560 | 6/1966 | Adomaitus | 264/108 |
| 3,332,369 | 7/1967 | Freed | 425/208 |
| 3,347,177 | 10/1967 | Mendoza | 425/466 |
| 3,457,880 | 7/1969 | Eppenberger | 425/205 |
| 3,748,079 | 7/1973 | Moreno et al. | 425/376 R |
| 4,082,488 | 4/1978 | Brinkschröder et al. | 425/204 |
| 4,269,582 | 5/1981 | Mella | 425/204 |

*Primary Examiner*—Jeffery R. Thurlow
*Attorney, Agent, or Firm*—Dominick Nardelli

[57] ABSTRACT

The apparatus has an extruding means and a spreader means whereby a continuous dough sheet is formed. To preserve the "softness" within the dough and the finished cooked product the extruding means has a double feed screw housing preferably disposed side-by-side and having their outlets joined by a Y-type fitting to form a single feed conduit which is coupled to a spreader means having a downwardly distending outwardly flaring passageway. To prevent dough from sticking to the surfaces of the passageway the opposing triangular shaped surfaces are each provided with a plurality of parallel grooves oriented at an angle to the dough path travel. To ensure no separation of dough when in the sheet form, the feed conduit is provided with a twister or helical thin member which ensures the interface surface within the dough is oriented at an angle of less than 90 degrees with the elongated cross-section the spreader means.

5 Claims, 7 Drawing Figures

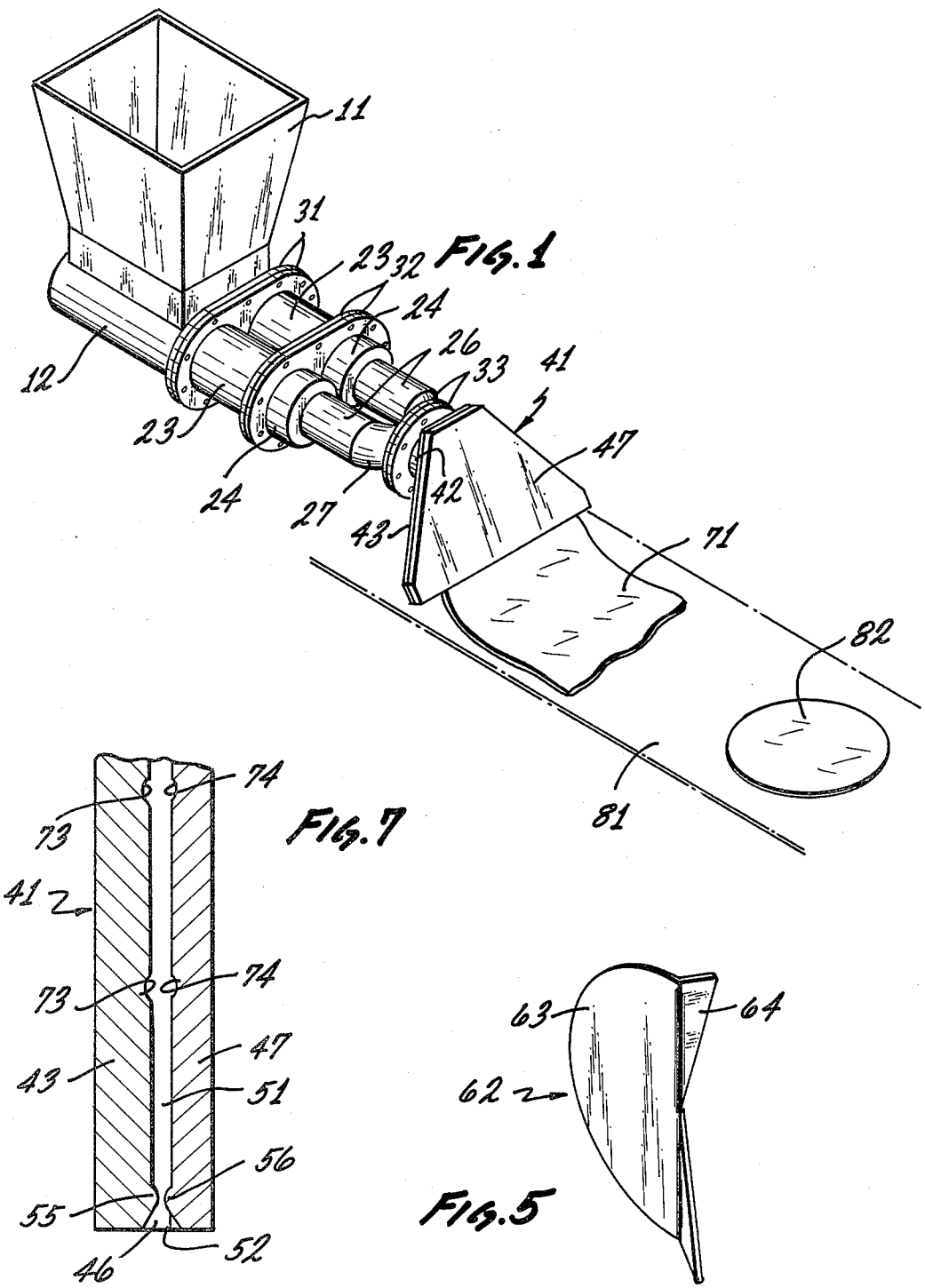

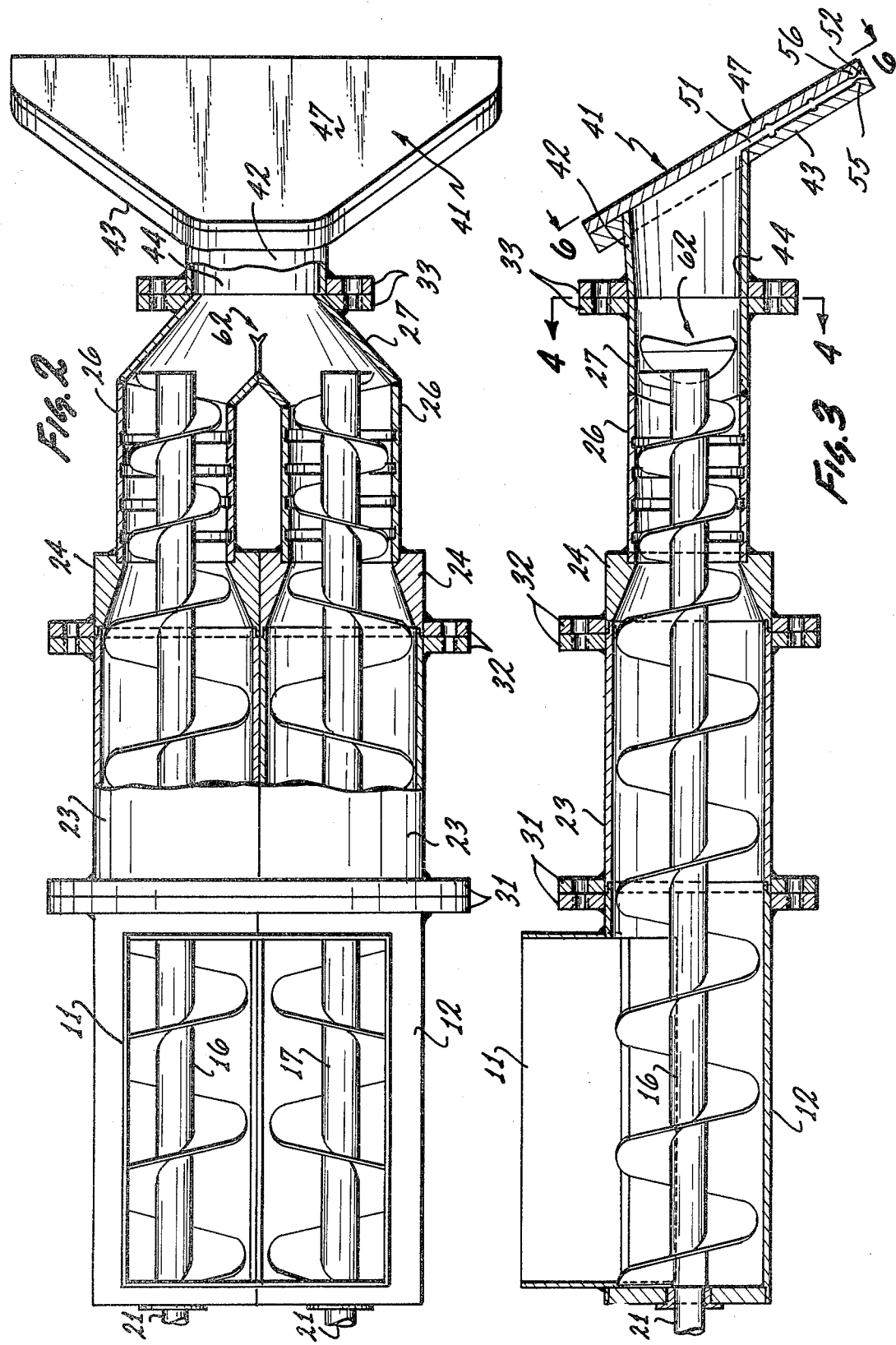

DOUGH EXTRUDER AND SHEET SPREADER APPARATUS

FIELD OF THE INVENTION

The invention relates to an apparatus that spreads bread dough into a continuous sheet and more particularly to an apparatus which provides an improved finished product. As used in this invention, the term "bread dough" means any product having a mixture of flour (wheat, corn, etc.) and water to form a plastic-like mass.

DESCRIPTION OF THE PRIOR ART

On past apparatus which formed a continuous sheet of bread dough there included an extruder means as taught in U.S. Pat. Nos. 2,543,198; 2,209,824 and 3,332,369 and also included a spreader means as taught in U.S. Pat. No. 3,748,079. These prior art apparatus produce a continuous sheet of dough which is fed onto a conveyor belt where the dough is cut into useable disk-like shapes. Although the prior art devices produce useable items, one finds that the thinness of the sheet as extruded is limited, unless one is willing to live with a bakery product that has lost its softness and texture. As I have discovered, to produce a thin sheet, a lot of energy must be fed into the dough by the extruder. This energy is converted into heat which raises the temperature of the dough. When this happens, I believe, the common term one uses is that the dough has lost its "gluten." Then instead of producing, for example, a thin tortilla, which is soft, one finds that the tortilla is crisp like a cracker.

OBJECTS OF THE INVENTION

An object of this invention is to provide a dough extruder and sheet spreader apparatus which produces a thinner sheet of dough than prior art devices.

Another object of this invention is to provide an apparatus which produces a continuous sheet of dough which is thinner, softer, and better textured than prior art apparatus have produced.

Another object of this invention is to provide an apparatus which produces a continuous sheet of dough which does not noticeably elevate the temperature of the dough therein.

These and other objects and features of advantages will become more apparent after one studies the following detailed description of the preferred embodiment of the invention together with the appended drawings.

BRIEF DESCRIPTION OF THE DRAWINGS

FIG. 1 is a pictorial view of my novel apparatus schematically shown.

FIG. 2 is a plan view of the apparatus shown in FIG. 1 which portion is broken away to show the internal details.

FIG. 3 is an elevation view in section taken substantially on the center line of one of the screw conveyors.

FIG. 5 is a pictorial view of the twister removed from the feed conduit.

FIG. 7 is a sectional partial view taken on line 7—7 of FIG. 6 in the direction of the arrows.

DETAILED DESCRIPTION OF THE DRAWING

Figure 4:
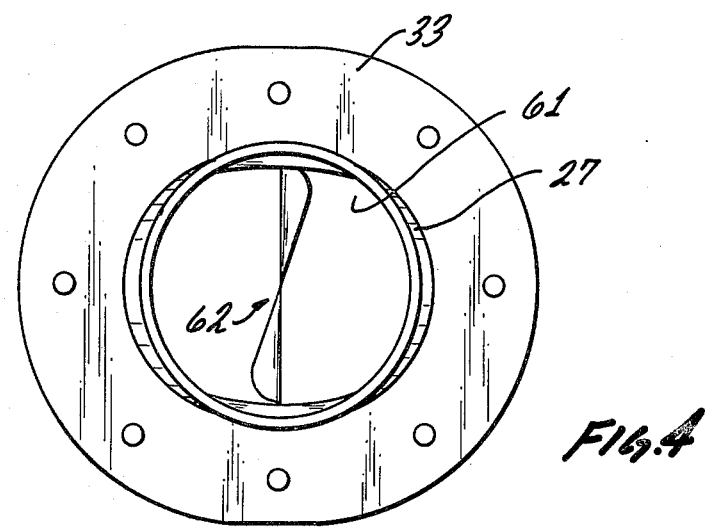
FIG. 4 is a section view taken on line 4—4 of FIG. 3 in the direction of the arrows, wherein the hopper portion has been omitted for clarity.

Referring to FIGS. 1, 2, and 3 wherein the novel apparatus is schematically shown, the apparatus has a hopper 11 into which wet dough is fed by gravity. The hopper 11 rests on top of the body 12 enclosing a pair of conveyor screws 16 and 17 which are similarly constructed but preferably one screw 17 has a left hand twist and the other screw 16 has a right hand twist. The screws 16 and 17 are disposed side-by-side and preferably horizontally and each has an axle 21 (FIG. 2) which extends out of one end of the body 12 and which axles are actuated by a suitable driving means (not shown). On the body 12 opposite the axles 21 there are two cylindrical housings 23 extending from and suitably fixed to the body 12. To the other end of each housing 23 a conical transition section 24 is attached, and each conical section 24 leads into another cylindrical housing 26 of smaller diameter than housing 23. A Y-type fitting 27 having two inlets and one outlet is attached to the ends of each housing 24. For ease in cleansing, the apparatus has suitable flanges 31, 32, and 33 provided between the different parts as shown in FIG. 2. The respective screws 16 and 17 extend into each housing 23 and 26 and conical sections 24 in a manner well known in the art. To flange 33 on the Y-fitting 27, a novel dough spreader 41 is coupled by another half of the flange 33.

Figure 6:
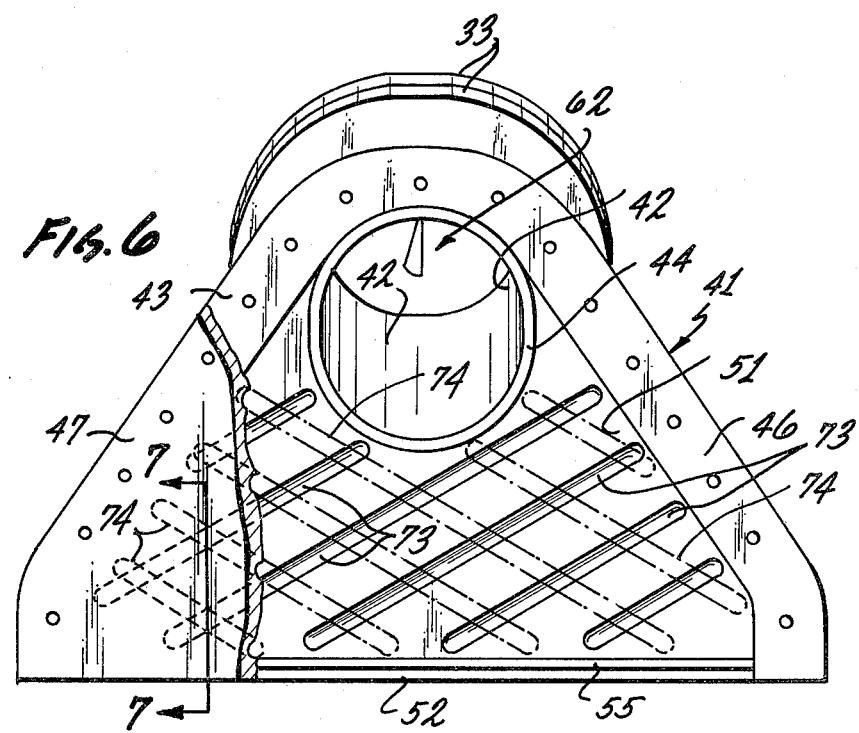
FIG. 6 is a view taken on line 6—6 of FIG. 3 in the direction of the arrows and partially broken away, wherein again the hopper portion has been omitted for clarity.

The novel spreader 41 is used to process dough into sheets of fixed thickness and width. The spreader 41 has a cylindrical inlet passageway 42 (FIG. 3) to which one of the flanges 33 is fixed and on the other end of passageway 42 and at an oblique angle to the axis thereof an apertured plate 43 is attached and fixed thereto. The plate 43 has substantially triangular shape as shown in FIG. 6 with an aperture 44 located at one corner thereof and to which aperture 44 the passageway 42 is fixed. As shown in FIGS. 6 and 7 the plate 43 has a relatively wide flange 46 extending along two sides of the triangular shape which sides are disposed on opposite sides of the aperture 44. The flange 46 extends perpendicularly from the face of the plate 43. To flange 46 a triangularly shaped cover plate 47 is removably attached to provide a downwardly distending outwardly flaring passageway 51 (FIG. 7) having an elongated egress 52. From FIG. 3, one will note that the thickness of the passageway 51 between plates 43 and 47 become thinner as one proceeds from the aperture 44 to the egress 52 and, at or near the egress 52, there are provided a pair of releasing ridges 55 and 56 on plates 43 and 47 respectively. The releasing ridges 55 and 56 are disposed parallel to the egress 52. Outwardly from the ridges 55 and 56 to the actual edge of the plates 43 and 47 the passageway 51 flanges outwardly.

Operation of the Apparatus

During the operation process, a mass of dough is placed into the hopper 11 and gravity fed into the body 12, wherein the rotating screws move the dough horizontally into and through each housing 23, conical section 24, and housing 26, into the fitting 27. The fitting 27 has two inlet branches each coupled to a respective housing 27 and meet at an outlet branch wherein a flange 33 is fixed so that the two streams of dough join to form one single stream exiting through a cylindrical opening 61 (FIG. 4) formed in flange 33 on fitting 27. Since the two streams of dough are disposed side by side a vertically seamed surface (not shown) is formed between the two streams of dough after they are joined together to make one stream. To ensure that the two streams do not separate as it passes through the spreader 41, a dough twister 62 is placed within fitting 27 as shown in FIGS. 2, 3 and 4. The twister is made of rigid sheet material wherein a portion 63 nearest the screws 16 and 17 is disposed perpendicularly and a portion 64 nearest the spreader 42 causes the seam surfaces within the dough when it enters the spreader to be at an acute angle with respect to the plates 43 and 47. Therefore because the plates 43 and 47 reactively apply pressure to the stream of dough to spread the stream into a sheet, the two seam surfaces are forced together to form an interface bond and blend with the rest of the dough.

To ensure that the sheet dough such as item 71 (FIG. 1) exiting the spreader is uniform and of even thickness, and also thinner than prior art devices, I have provided grooves or recesses in the internal surfaces of plates 43 and 47. As shown in FIG. 6 plate 43 has a plurality of parallel grooves 73 formed therein and disposed at an acute angle with the egress 46, while plate 47 has a plurality of similar parallel grooves 74 (shown by dash lines in FIG. 6) and are also disposed at an acute angle with the egress 46. However, as shown in FIG. 6 grooves 73 slope to the left and grooves 74 slope to the right. These grooves aid in forming a more uniform dough sheet 71 especially when the sheet is thinner than sheets as produced by an apparatus, such as the one described, which does not have such grooves 73 and 74. Releasing ridges 55 and 56 also improve on the uniformity of the finished produce 71. As shown in FIG. 1, the dough sheet 71 is placed on a conveyor 81 (schematically shown) and transported to a cutting area where round disk-like sheets 82 of dough are formed.

I have discovered that by using the above-described twin screws 16 and 17, I am able to apply enough pressure or force to the dough whereby the spreader 41 is able to form a dough sheet up to 24 inches wide and about one-eighth of an inch in thickness and still not distort the gluten within the dough. As I mentioned above, my definition for gluten is the ability of the dough to remain soft in texture even after cooking so that the cooked product does not become crisp.

Having described the preferred embodiment of my invention one skilled in the art, after studying the above detailed description thereof can devise other embodiments without departing from the spirit of my invention. Therefore, my invention is not to be considered limited to the disclosed embodiment but includes all embodiments falling within the scope of the appended claims.

I claim:

1. An extruder and dough spreader apparatus for viscious plastic material, said apparatus comprising:
   a body having an opening disposed on its top for feeding said material therein and at least one opening disposed on its side;
   a pair of conveyor screws parallelly disposed within said body and extending through said side opening;
   a pair of tubular housings fixed to said side opening and each of said housings enclosing a respective screw;
   a Y-type fitting having two inlet ducts communicating with an outlet duct;
   each of said inlet ducts on said fitting being coupled to a respective one of said housings;
   a spreader having an inlet passage and an elongated egress;
   said inlet passageway of said spreader being coupled to said outlet of said Y-type fitting;
   said conveyor screws being disposed side by side substantially in the same horizontal plane;
   each of said conveyor screws having a larger outer diameter in its portion adjacent said body than its outer diameter in its portion adjacent said Y-fitting;
   each of said housings having a larger inner diameter in its portions adjacent said body than its inner diameter in its portion adjacent said Y-fitting.

2. The apparatus of claim 1 wherein said spreader comprises:
   an aperture plate shaped substantially triangular having an aperture disposed at one corner thereof and having said inlet passageway communicating with said aperture;
   a cover plate shaped substantially similar to said aperture plate and disposed in a back-to-back relationship to said spreader plate to form a distending outwardly flaring passageway therebetween and having an elongated egress disposed opposite said aperture on said plate.

3. The apparatus of claim 2 wherein:
   said distending outwardly flaring passageway becomes thinner as the passageway becomes removed from said aperture in said plate;
   a releasing ridge is disposed on each of said plates and extending into said flaring passageway and each of said ridges are disposed near said egress.

4. The apparatus of claim 3 wherein:
   each of said plates having formed on their respective facing surfaces a plurality of parallelly disposed grooves and disposed at an acute angle to said egress;
   said parallel grooves on one of said plates are disposed in crossing relationship to said parallel grooves on the other of said plates.

5. An apparatus comprising:
   a one piece aperture plate shaped substantially triangular having an aperture disposed at one corner thereof;
   an one piece cover plate shaped substantially similar to said aperture plate and disposed in back to back relationship to said aperture plate to form a distending outwardly flaring passageway having an elongated egress disposed opposite said aperture on said plate;
   said descending outwardly flaring passageway becomes thinner as the passageway becomes removed from said aperture in said aperture plate;
   a releasing ridge being formed integral on each of said plates and extending into said flaring passageway and disposed near said egress and opposite each other;
   each of said plates having formed on their respective facing surfaces a plurality of parallely disposed straight grooves which are disposed at an acute angle to said egress;
   said parallel grooves on one of said plates being disposed in crossing relationship to the parallel grooves on the other of said plates.

* * * * *